United States Patent [19]
Frentrop

[11] 3,775,216
[45] Nov. 27, 1973

[54] NEUTRON GENERATING SYSTEMS

[75] Inventor: Arthur H. Frentrop, Ridgefield, Conn.

[73] Assignee: Schlumberger Technology Corporation, Houston, Tex.

[22] Filed: Feb. 19, 1970

[21] Appl. No.: 14,872

Related U.S. Application Data

[62] Division of Ser. No. 627,404, March 31, 1967, Pat. No. 3,508,058.

[52] U.S. Cl................ 156/293, 156/294, 156/295, 250/83.6 W, 250/84.5, 313/61
[51] Int. Cl.............................................. B29c 1/08
[58] Field of Search.....................156/293–295, 325; 250/84.5, 83.6 W; 313/61; 29/199; 75/153, 173

[56] References Cited
UNITED STATES PATENTS 3,246,191 4/1966 Frentrop........................... 250/84.5

Primary Examiner—Robert F. Burnett
Assistant Examiner—M. E. McCamish
Attorney—William R. Sherman, Stewart F. Moore, Jerry M. Presson, Edward M. Roney, Ernest R. Archambeau, Michael J. Berger, James C. Kesterson and David L. Moseley

[57] ABSTRACT

One embodiment of the invention describes a neutron generator tube in which the gas supply is thermally isolated from the ion source by reflective and conductive heat members. The conductive heat member is in thermal contact with the tube envelope to permit the envelope to dissipate waste heat from the ion source to an insulating gas ($SF_6$) in a well logging tool housing. The tool housing also is insulated from an ion source magnet to prevent arcing between the magnet and the tube envelope.

5 Claims, 6 Drawing Figures

PATENTED NOV 27 1973

INVENTOR
Arthur H. Frentrop
BY John P. Sinnott
ATTORNEY

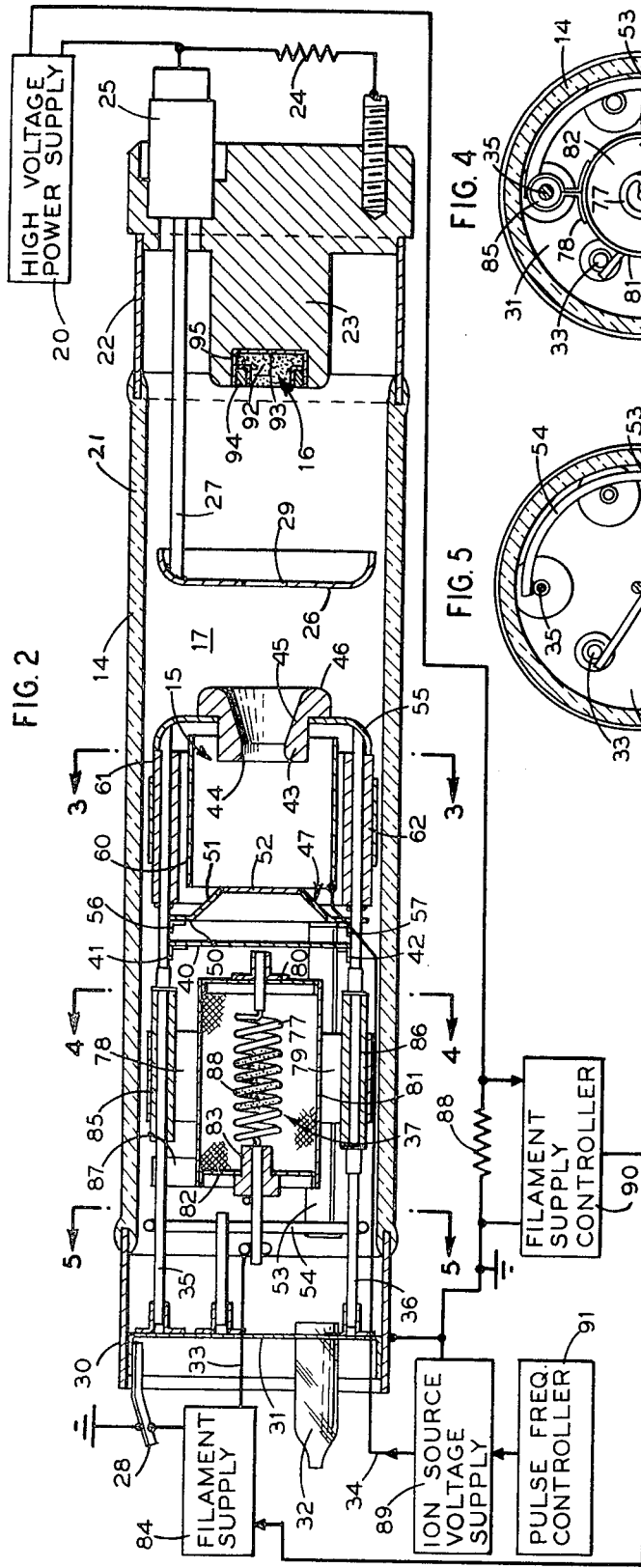

NEUTRON GENERATING SYSTEMS

This application is a division of copending application Ser. No. 627,404 filed on Mar. 31, 1967, now U.S. Pat. No. 3,508,058 issued Apr. 21, 1970.

This invention relates to neutron generating systems and more particularly pertains to a new and improved neutron generator especially adapted to traverse the narrow confines of a well or borehole, although useful in a variety of other applications. Since a neutron generator embodying the invention is ideally suited to the needs of well logging services, it will be described in that connection.

It has been proposed heretofore that a generator of high energy neutrons be employed in neutron-gamma ray or in neutron-neutron logging. As contrasted with a radium-beryllium source conventionally utilized for such logging, a neutron generator may feature a negligible amount of radiation other than the desired neutrons, a high yield of neutrons, a controllable yield of neutrons in bursts or continuously, neutrons at higher energies than formerly possible, mono-energetic neutrons, and control of the generator so as to permit its deactivation prior to withdrawal from or insertion in a well. The first five of these attributes are important in obtaining more informative logs, while the last is valuable in minimizing health hazards to operating personnel.

In general, prior neutron generators typically required auxiliary vacuum pumping equipment and were often designed to provide access for replacement of such parts as the target. Their operation and servicing required highly skilled technicians. Their structure was much too large to be passed through a borehole and not adaptable to the source-detector spacing requirements of well logging. They were not packaged for convenient portability or designed for unskilled or arduous use. Moreover, they oftentimes were not capable of long-continued, service-free operation.

It is, therefore, a primary object of the present invention to provide an improved neutron generator which overcomes one or more of these disadvantages of prior devices.

This and other objects of the present invention are obtained by providing a neutron generator employing a heated source of heavy hydrogen gases, e.g., about equal parts of deuterium and tritium, and an adjacent ion source for ionizing this gas mixutre. A substantially constant gas pressure is maintained within the ion source for optimum stability. The temperature of the gas source, however, determines the gas pressure within the ion source. Accordingly, thermally conductive and reflective members are interposed between the ion source and the gas source, to isolate the gas source from the ion source and maintain the gas source heat balance at the desired temperature, without regard to temperatures of other portions of the tube structure.

The heat generated in the ion source is directed endwise to the exterior of the neutron generator through a thermally conductive member which is a part of the ion source. Thermal radiation from the conductive heat member, moreover, is reflected back toward the ion source. This arrangement is used with a gas source heating filament that has a gas absorbing and emitting material only on the central portion thereof. This specific arrangement has been found to prevent gases that are emitted from the hot central portion of the filament from being reabsorbed unproductively in the colder end portions. In addition to these structural features of the invention, the method of charging the gas source with the aforementioned gas mixture also contributes substantially to the efficiency of the neutron generator.

In the preferred embodiment of the invention, the neutron generator is cooled with an insulating gas that eliminates the need for troublesome and difficult-to-handle oils which heretofore have been used as insulating coolants in well logging tools. The proclivity toward arcing and breakdown caused by the high voltage needed for neutron generator operation is further reduced by electrically insulating the ion source magnet from the packaging or well logging equipment housing.

The carbon target provides another novel feature of the invention that further contributes to the efficiency and long life of the neutron generator. The target is a carbon button of sufficient thickness to be self-supporting. The target, moreover, is replenished with target gases by generator operation. Inasmuch as neutron generators used in well logging applications are subjected to arduous field conditons, a novel technique is provided for assembling and retaining this carbon button in thermal and electrical contact with a metal electrode in such a way that the target cannt be jarred loose during handling and operation.

The novel features of the present invention are set forth with particularity in the appended claims. The present invention, both as to its organization and manner of operation, together with further objects and advantages therof, may best be understood by reference to the following description taken in connection with the accompanying drawings in which:

FIG. 2 is a view in longitudinal section of an exemplary embodiment of the neutron generator shown in FIG. 1;

FIG. 3 is a transverse view taken in the direction of the arrows 3—3 of FIG. 2;

FIG. 4 is a transverse view taken in the direction of the arrows 4—4 of FIG. 2;

FIG. 5 is a transverse view taken in the direction of the arrows 5—5 of FIG. 2; and FIG. 6 is an enlarged view in longitudinal section of a portion of the structure shown in FIG. 2.

Figure 1:
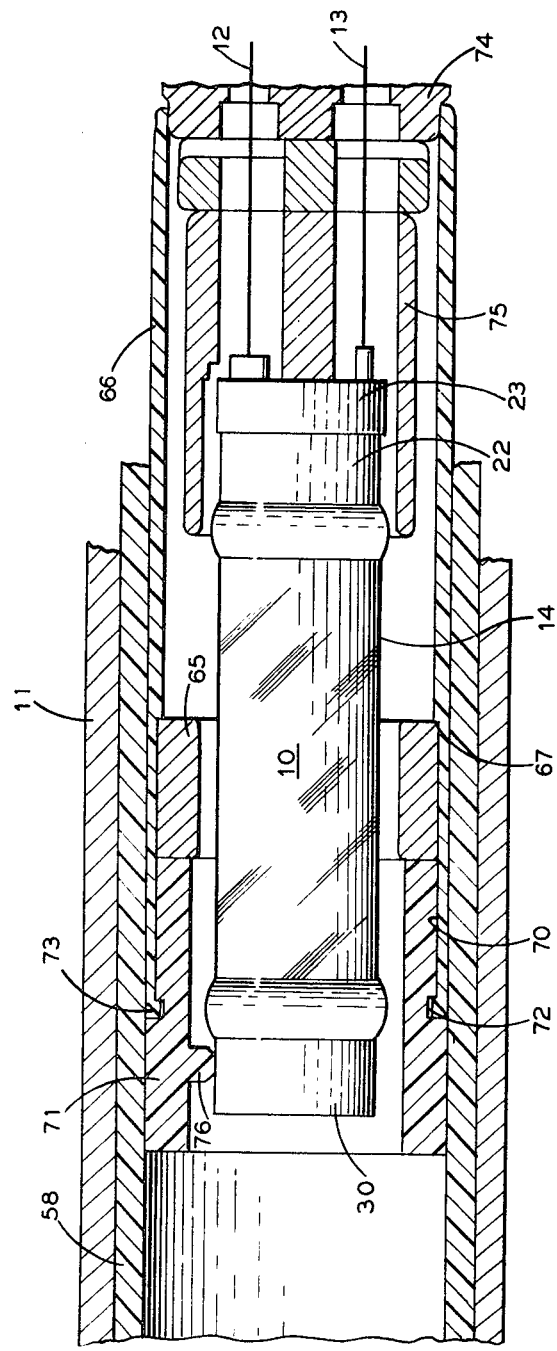
FIG. 1 is a view in longitudinal section of a preferred embodiment of the present invention.

FIG. 1 illustrates a neutron generator tube 10 which, for purposes of well logging applications, may be contained in a pressure resistant housing 11 made of steel or the like, for movement through a well bore traversing earth formations (not shown). To provide suitable electric power to the neutron generator, conductors 12 and 13 are connected to appropriate power supplies, as will be described subsequently. If desired, suitable portions of these supplies may be located at the earth's surface and connected with the neutron generator via conductors of a supporting cable.

The neutron generator 10 more particularly comprises an envelope 14 containing an ionizable gas composed of at least one heavy hydrogen isotope, an ion source 15 (FIG. 2) and a target 16. The target 16 is spaced from the ion source 15 by an ion accelerating gap 17 across which a high voltage is developed by supply 20. Thus, ions of the heavy hydrogen isotope derived from the ion source are accelerated across the gap toward the target. Neutrons are generated upon collision of accelerated ions with ions which have been impacted in the target as a result of previous bombardment.

Considering now the construction of the envelope 14, it is seen to comprise a sleeve 21 of glass or ceramic material extending across the ion accelerating gap, together with the ion source 15 and a section providing a source of heavy hydrogen isotopes, to be described more particularly hereafter. At the target end, the sleeve 21 is fused to a metallic sleeve 22 composed of Kovar or the like. The sleeve 22 in turn is brazed to a target electrode 23 which is shaped to provide an end closure for the envelope. The target electrode 23 may be composed, for example, of copper and has a reduced diameter portion extending inwardly of the envelope to support the target 16. The electrode 23 provides a conductive path between the target 16 and the high voltage supply 20 via a voltage dropping resistor 24. The target electrode 23 also has a hermetically sealed passage 25.

A dished, annular suppressor electrode 26 is supported opposite ion source 15 by means of a conductor rod 27 which extends through the passage 25 in insulated relation with the target electrode 23 and connects the suppressor electrode with the high voltage supply 20. The target electrode 23 in cooperation with rod 27 thus supports the target 16 and annular suppressor electrode 26 in fixed, coaxial spaced relationship within the envelope 14 with the suppressor 26 somewhat closer to the ion source 15 than to the target 16.

During tube operation, as described in more complete detail hereafter, the suppressor electrode 26 is kept at a more negative potential than the target 16. Secondary electrons emitted from the target 16 during ion bombardment are returned to the target by the electric field thus established between the suppressor and the target. Deflecting the secondary electrons in the tube in this manner prevents these electrons from striking the cathode 43 and unproductively draining high voltage accelerating power from the tube.

If, moreover, tube operation is continuous, a low tube gas pressure of about 1 micron or more is favored and the suppressor electrode 26 functions in the manner described. During pulse operation, however, the function of the suppressor electrode 26 is less important, inasmuch as the ion bombardment of the target may proceed in bursts spaced in time. If the bursts are sufficiently short, and well separated from each other, secondary electrons in the accelerating gap 17 are dissipated in the interval between the bursts and no special effort need be taken to remove the electrons. Accordingly, in pulse operation the suppressor electrode may be maintained at a more negative potential than the target 16, or more positive than the target but more negative than the cathodes of the ion source 15, or entirely removed from the tube 10. A typical tube gas pressure during pulse operation is on the order of 10 to 20 microns.

Envelope 14 (FIGS. 2 and 5) also comprises a metal sleeve 30, like sleeve 22, fused to one end of vitreous sleeve 21 and hermetically sealed at its further end by a transverse end cap 31 that is brazed to the sleeve 30. End cap 31 performs a supporting function and serves as a ground return electrode through a conductor 28. Cap 31 also serves as a header carrying a pinch-off tubulation 32 and insulated, hermetically sealed lead-ins for conductors 33 and 34 (FIG. 5).

In its supporting function, end cap 31 carries two or more longitudinally extending support rods 35 and 36 at diametrically opposite positions for mounting the ion source 15 and a source 37 of heavy hydrogen isotopes in spaced relation within the envelope sleeve 21 (FIGS. 2 and 4). Also supported by rods 35 and 36 is a reflective heat transfer member 40 in the form of a metallic disc spaced between the isotope source 37 and the ion source 15 to minimize heat transfer between them. Member 40 is preferably composed of a metal having a low thermal absorptivity (or high reflectivity) and yielding a minimum of secondary electrons in response to impinging electrons. It has been found, for example, that reflective member 40, when made of a 0.020 inch thick disc of nickel reduces the quantity of heat transferred from ion source 15 to gas source 37 to one quarter of that which would have been transferred in the absence of the reflective shield. In order to preserve the character of the member 40 as a thermally reflective body, and to isolate the member thermally from the tube structure, member 40 is connected to support rods 35 and 36 only by small angle members 41 and 42.

The ion source 15 (FIGS. 2 and 3) more particularly comprises a probe 43 with a relatively large aperture 44 therethrough having a rounded termination in a flat end face. The probe 43 constitutes one cathode 45 of the ion source. In the direction toward the target 16, the aperture 44 diverges outwardly into a torus-shaped contour 46 to minimize high field gradients and any resulting tendency toward voltage breakdowns. Opposite the cathode 45 is a second cathode 47.

In accordance with the invention, the second cathode 47 completes the thermal isolation of the gas source 37. Cathode 47 is connected to support rods 35 and 36. The cathode provides a conductor for the heat accumulated in the ion source 15. Structurally, the cathode 47 comprises an annulus 50 of nickel or the like having an inner countersunk position 51, the ends of which are disposed toward the probe cathode 45. A thick member, or plug 52, of thermally and electrically conductive material, such a molybdenum, is fixed in the central aperture of the annulus 50 to complete the cathode structure.

Heat generated in the ion source 15 is absorbed by the plug 52 in the cathode 47. The heat is transferred by conduction to the metal sleeve 30 and end cap 31 where it is dissipated as will be described subsequently. A conductive path for this cathode heat is established through a thermally conductive strap 53 that extends from a welded contact with the annular portion 50 of the second cathode 47 to a welded contact with arcuate support rod 54. The arcuate rod 54 conducts the heat to the rods 35 and 36, which, in turn, transfer the heat to the end cap 31 and the sleeve 30.

Heat radiated by the plug 52 is obstructed by the reflective heat transfer member 40 and reflected back to the plug 52. Thus, the cooperation between the reflective and conductive heat barriers provided by the member 40 and the cathode plug 52 thermally isolate the gas source 37 and enable the source to maintain a substantially constant temperature.

The cathodes 45 and 47 are supported in fixed spaced relation, respectively, by an apertured dish-shaped plate 55 and small angle members 56 and 57 which are, in turn, joined to support rods 35 and 36.

The ion source 15 also comprises a cylindrical anode 60 which extends about and overlaps the space between cathodes 45 and 47. Anode 60 is carried in this spaced relationship by straps 38 and 39 that extend around the support rods 35 and 36 and are insulated by insulator sleeves 61 and 62 so that the anode can be maintained at the voltage applied via the conductor 34.

The ion source fully comprises a sleeve-like or cylindrical permanent magnet 65 (FIG. 1) which is coaxial with the cathodes 45 and 47. The magnet 65 is polarized to establish a general uniform, high flux density axially within the region between the cathodes 45 and 47. Desirably, the massive probe 45, as well as supporting plate 55, is composed of nickel to promote high flux density within the ion source. Also, magnet 65 is preferably of a relatively short axial dimension, e.g., one inch, to minimize the short circuiting effect of cylindrical steel pressure housing 11 (shown in fragmentary form for convenience of illustration) which contains the neutron generator tube 10.

Because potentials on the order of 100 kilovolts (kv) or more are required to operate the neutron generator 10, it has been found that arcing or discharges may occur between the magnet 65 and the tube envelope 14 when the magnet is grounded to the steel housing 11. In accordance with the invention, the magnet 65 is insulated from the housing 11 by an outer sleeve 58 of insulating material and an inner, circumscribing insulating sleeve 66 of Teflon, or the like, interposed between the housing and the magnet. Electrically insulating the magnet 65 in the foregoing manner decreases the voltage gradient between the magnet and the tube envelope and thereby substantially reduces the likelihood of arcing between tube and magnet. In order to fix the position of the magnet relative to the ion source 15 and align the neutron generator 10 within the housing 11, the magnet abuts a shoulder 67 formed in a recess 70 in the insulating sleeve 66. The magnet 65 is fixed in abutting relation with the shoulder 67 by a telescoping cylinder 71 of Teflon that fits within the recess 70. The upper end of the cylinder 71 engages the magnet and locks the magnet between the shoulder 67 and the cylinder 71.

The cylinder 71 has a circumferential groove 72 formed in the outer surface thereof which receives a protruding detent 73 on the insulating sleeve 66 that fixes the position of the cylinder 71 and the magnet 65. The neutron generator 10 is aligned with the magnet 65 and housing 11 by an insert 74 which is secured to the target electrode 23 by screws or the like (not shown). The insert 74 is snugly received within the insulating sleeve 66 and supports the neutron generator 10 and a corona shield 75 which is spaced from and shrouds the metal sleeve 22. The gas source end of the neutron generator is further aligned with the longitudinal axis of the housing 11 by a radial and inwardly disposed protrusion 76 formed on the inner surface of the insulating cylinder 71.

Since high voltages and temperatures are present in the vicinity of the neutron generator 10, the space between the housing 11, the magnet 65 and the envelope 14 is desirably filled with an insulating coolant.

In accordance with a feature of the invention, an insulating coolant gas, such as sulfur hexafluoride (SF$_6$) or perfluoropropane, is used to prevent arcing within the housing 11 and to remove heat from the neutron generator 10. It will be recalled that heat generated by the ion source 15 (FIG. 2) was conducted from the ion generator 15 to the metal sleeve 30. The gas absorbs the heat from the sleeve 30 and carries this heat by convection through passageways in the corona shield 75 and the insert 74 to cooler portions of the housing 11, where the heat is discharged to the environment outside of the housing.

Gases ordinarily exhibit poor heat transfer characteristics and experience breakdown and arcing when applied potential gradients exceed approximately 10 kv/in. Accordingly, gases were not considered satisfactory for cooling well logging equipment. This situation was true with particular reference to logging tools that contained neutron generators, inasmuch as these generators required the establishment of potential gradients of about 100 kv/in. to 1000 kv/in. within the logging tool housing. Thus, oil ordinarily was used as an insulating coolant. Oil was unsatisfactory because it decomposed during use and had to be handled under laboratory conditions. The volatilization and thermal expansion characteristics of oil, as well as dissolved gases within the oil also are troublesome, inasmuch as ballast volume must be provided within the tool to accommodate expansion, and dissolved gases must be removed before use. Contrary to the general belief that gases are poor neutron generator insulators and coolants in logging tools, sulfur hexafluoride at a pressure of 25 psi within the housing 11, has been found to provide the necessary thermal and electrical properties and is not subject to the operational shortcomings which have marked the use of oil.

To provide a supply of heavy hydrogen isotopes, source 37 (FIGS. 2 and 4) comprises a filament 77 composed, for example, of tungsten, through which an electric current may be passed. Filament 77 is shown in the form of a spiral wire having one end grounded in supporting relation to an end cap 80 of a heat shield can. The can's cylindrical wall 81 is foraminous and extends beyond the length of filament 77 to further end cap 82. The other end of filament 77 is connected to a length of conductor 33 which extends through insulating ferrule 83 to make an electrical connection between filament 77 and filament supply 84. The cylindrical wall 81 in the can is supported by straps 78 and 79 that extend around respective insulating sleeves 85 and 86 on rods 35 and 36 so as to be thermally insulated from the portion of the rods near the ion source 15. A small strap 87 provides a direct ground connection between the wall 81 and support rod 35.

The filament 77 carries a zirconium, or like heavy hydrogen absorbent caoting 88 (FIG. 2) only on intermediate turns of its spiral coiling. Along such turns a substantially uniform temperature can be maintained by passage of controlled heating current from filament supply 84, whereas the endwise turns of the filament coil are relatively cooler due to thermal conduction. The zirconium coating 88 responds to increases in filament temperature by emitting absorbed gas, and increasing the gas pressure in the envelope until an equilibrium pressure is reached. Conversely, decreases in filament temperature cause the zirconium to absorb gas from the tube atmosphere and thereby decrease the tube gas pressure.

As hereinbefore considered, a specific gas pressure is established within the tube 10 for each filament temperature, in accordance with the tube operation desired, either continuous or pulse. Consequently, as gases are withdrawn from the tube atmosphere for neutron generation, the coating 88 releases more gases to restore the gas pressure to a level commensurate with the filament temperature.

As hereinbefore mentioned, it was found that a uniformly distributed coating or gas absorbing material over the entire length of the filament 77 caused gas to be released from the hot central portion of the filament and to be absorbed almost immediately after release by the cooler end portions. The gas thus reabsorbed failed to contribute to the neutron generation process and shortened the effective life of the tube, in addition to wasting gas. Thus, by coating only the central portion of the filament 77 the end absorption is eliminated and tube life is increased.

It has been found that the deuterium and tritium gases ordinarily are emitted from the coating 88 in the reverse of the order in which they were absorbed. This situation produces an undesirably non-uniform gas mixture in the neutron generator during the life of the tube. Nevertheless, the filament 77 is charged with the correct gas mixture by first heating the filament in an atmosphere of one of the gases to absorb an appropriate amount of that gas. The atmosphere is then changed to that of another of the two gases and the filament is heated again until the correct quantity of the second gas is absorbed.

If the gases are premixed, for example, to a half-and-half concentration of deuterium and tritium for absorption by the filament 77 in one step, cross contamination of the gas filling equipment can occur. Accordingly, the initial deuterium and tritium charging portion of the process is performed in separate steps. Subsequently, and in accordance with a feature of the invention, the filament is heated to an appropriate temperature to drive the gases from the filament and causes these gases to diffuse into a uniform mixture. The commingled gases then are reabsorbed by the filament to produce a homogeneous mixture of deuterium and tritium within the coating 88. All of these steps may be performed after the tube is fully assembled and thoroughly outgassed of adsorbed contaminants, but before the tube is operated to produce neutrons. Teh homogeneous gas mixture within the coating 88 avoids the non-uniform filament outgassing which heretofore has marked neutron generator tube operation.

To provide a controlled flux of neutrons, continuously or in recurrent bursts, an ion source voltage supply 89 provides power for the bombarding ion beam. For pulse operation, a pulse frequency controller 91 can be provided to regulate the operation of the voltage supply 89. Controller 91 may be of any suitable type that will emit timed pulses of selected duration and rate, e.g., about 10 microseconds or more, repeated every second, or less.

A filament supply controller 90 regulates the intensity of the ion beam by controlling gas pressure in the envelope 14 in response to the voltage developed across a resistor 88. The resistor 88 connects the filament supply controller 90 and the high voltage power supply 20 to ground. The current flowing through the resistor 88 provides a measure of ion beam current that enables the filament controller 90 to adjust the generator gas pressure accordingly. The voltage developed by the high voltage supply 20, moreover, is applied directly to the suppressor electrode 26 and through the dropping resistor 24 to the target electrode 23. The voltages thus developed provide accelerating and suppressor potentials, respectively. During operation, current is passed through the filament 77 of the gas supply 37 from the filament supply 84 in an amount regulated by the filament controller 90 to achieve a deuterium-tritium pressure within the generator envelope that is appropriate to a desired ion beam current and generator operating condition.

In accordance with the present invention, the production of neutrons is made more efficient by employing carbon as a "self-building" target 16. The target may be in the form of a button 92 (FIG. 6) of high purity or reactor grade carbon having a flange 96 on one end and a shank portion 97, adjoining the flanged end that is oriented toward the ion source 15. The button 92 is positioned flange first on the flat face of a recess 93 fomred in the target electrode 23 and centered opposite probe aperture 44 and aperture 29 in the suppressor 26.

The target button 92 is retained in the recess by metallic mounting ring 94 of copper, or the like, that fits in the annular recess at the ned of the target electrode, between the shank portion 97 and the sides of the recess 93, and overlaps the flange 96.

Because it is difficult to make a sturdy, temperature insensitive connection between carbon and metal, the mounting ring 94 is bonded or brazed to the target electrode 23 with a copper-silver eutectic brazing compound 95. The union thus formed between the ring 94 and the electrode 23 locks the button 92 in the recess 93, notwithstanding the failure of the brazing compound 95 to join the carbon to the metal electrode.

The target 16 is assembled by first placing a quantity of the brazing compound 95 on the flat face of the recess 93. The target button 92 is inserted in the recess in the correct orientation and the mounting ring is placed in the annular space between the button and recess wall. An axially directed force is applied to the target surface of the button 92, in the direction indicated by the arrows in FIG. 6, while the assembly is heated above the melting point of the eutectic. In response to the applied force, the melted eutectic compound 95 flows and spreads between the ring 94, the button 92 and the sides of the recess 93. On cooling and solidification, the button 92 is locked securely to the target electrode 23 to produce a rugged thermal and electrical contact therebetween. Thus, heat generated at the target 16 as a result of ion bombardment is absorbed by the copper electrode 23 and dissipated by the sulfur hexafluoride insulating and cooling gas in the manner hereinbefore described.

The target button 92, more particularly, has been found to exhibit a high capacity for containing hydrogen isotopes with which the target is bombarded. Moreover, the low atomic number of carbon assures relatively greater penetration of the target surface by the bombarding ions so that a greater volume of retained hydrogen isotope is available for reaction. By utilizing a solid carbon button, continued integrity of the target under intensive bombardment of long duration is assured.

In constructing the neutron generator tube 10 for utilization in well logging or other applications, the parts are assembled under the exacting conditions required in high-vacuum technology. In a newly assembled tube the target button 92 contains none of the gas isotopes. Rather, proper target loading is accomplished during initial operation of the tube.

In operation, current is passed through the filament 77 of the isotope source in a regulated amount to achieve the desired deuterium-tritium pressure within the tube. Voltage then is applied to the cylindrical anode 60 of the ion source with respect to the confronting cathodes 45 and 47 (typically at ground potential). In a preferred form of this neutron generator, its envelope encloses an atmosphere comprising equal parts of deuterium and tritium at a pressure regulated in the aforementioned manner at a desired value, for example, one micron for steady state production of neutrons and a somewhat higher value such as 10 to 20 microns for pulsed operation.

In a manner now well known in the art, development of the electric field potentials within the ion source in a direction generally cross-wise to the direction of the magnetic field established by permanent magnet 65 results in a relatively efficient ionization of the hydrogen isotopes despite the employment of typically low pressures required to minimize risk of voltage breakdown in the high voltage gap 17. In effect, the magnetic field causes electrons moving from the cathodes toward the anode to follow spiralled paths of such greater length as to increase the probability of ionizing collisions in the deuterium-tritium atmosphere.

High voltage also is applied between the cathode 45 of the ion source and the target to establish a very strong voltage gradient to accelerate the ions of deuterium and tritium out from the ion source and toward the target. Initially, the potential applied to the target electrode 23 may be, say 10 kv to check insulation. For operating conditons, however, negative voltages in the approximate range of 40 kv to 120 kv may be employed with 80 kv as a typical value.

With application of high voltage across the accelerating gap 17, an initial bombardment of the target by deuterium and tritium ions occurs with relatively little prodution of 14 million electron volt (MeV) neutrons. As increasing quantities of impinging ions penetrate and are held in the carbon lattice, however, the probability of a nuclear interaction increases. After a relatively short period of impacting the target by continuous or pulsed operation, a stable output of 14 MeV neutrons is achieved with flux intensities, pulsed or continous, on the order of $10^7$ or $10^8$ neutrons per second.

The isotope source filament 77 replenishes the supply of hydrogen isotopes for ionization, acceleration and neutron-generating interactions at the target. Stability of the neutron flux output is achieved through the control loop provided by the resistor 88 and voltage controller 90 to which the filament voltage supply 84 is responsive, within the range appropriate to the pressure maintained by the isotope supply.

If the neutron output should increase as a result of an increase in the ion current across the acclerating gap 17, a corresponding increase in current through the resistor 88 causes the filament supply conroller 90 to reduce the filament power and thereby reduce the gas pressure within the generator. Reduction in the gas pressure in effect decreases the number of ions available for acceleration, and thus restores the neutron flux output to a stable predetermined value. Similarly, a decrease in the current through the resistance 88 causes the filament controller 90 to increase the generator gas pressure.

If desired, the neutron flux output can be monitored directly and either the ion source voltage supply 89, or the high voltage power supply 20 can be manually or automatically controlled to achieve stable generator operation.

Stability of operation also involves utilization of means such as the reflective and conductive heat transfer members 40 and 52, as well as the thermally conductive target electrode 23, to minimize disturbances of operation arising from changing temperature in the ion source or at the target. The heated filament 77 is, of course, operated at a constant temperature commensurate with the optimum gas pressures within the ion source 15. The gas source is kept at this constant temperature by directing the heat flow from the ion source toward the metal sleeve 30 and thence to the insulating $SF_6$ cooling gas for dissipation in the media surrounding the housing.

In contrast to the declining yield obtained with zirconium targets proposed in the prior art, use of the carbon target 92 has been found to provide a constant high neutron yield over an extended lifetime on the order of 100 hours or more when replenished by a mixed beam of deuterium and tritium. The importance of maintaining a high yield may be appreciated particularly with use of the neutron generating tube in well logging applications by realizing the significance of a high neutron flux in obtaining good statistical accuracy of measurements. In some cases, declining yield would also adversely affect calibration of the measurements which could result in erroneous interpretations. Moreover, continued high yield extends the economic lifetime of the neutron generator tube with attendant cost advantages in the tube itself, as well as savings in the maintenance operations entailed in replacement of the tube.

In the event the tube is filled only with deuterium gas, neutrons are obtained as a result of deuterium-deuterium interactions at the target.

While particular embodiments of the present invention have been shown and described, it is apparent that changes and modifications may be made without departing from this invention in its broader aspects and, therefore, the aim of the appended claims is to cover all such changes and modifications as fall within the true spirit and scope of this invention.

What is claimed is:

1. A method for assembling a target for a neutron generator comprising placing a quantity of bonding composition on the bottom of a recess formed in an electrode, superimposing a carbon button having a flange thereon over the bonding composition, interposing a ring over the flange of said carbon button within said electrode recess, melting said bonding composition, urging said carbon button against said recess bottom to cause said melted bonding composition to flow between said ring and at least one side of said electrode recess, and thereafter solidifying said bonding composition.

2. A method for assembling a target for a neutron generator comprising placing a quantity of bonding composition on the bottom of a recess formed in an electrode, superimposing a carbon button having a shank portion and a flange portion over the bonding composition, interposing a ring surrounding said shank portion of said carbon button at least partially within said electrode recess, melting said bonding composition, urging said flanged portion of said carbon button against said recess bottom to cause said melted bonding composition to flow between said ring and at least one side of said electrode recess, and thereafter solidifying said bonding composition.

3. A method for assembling a target for a neutron generator comprising placing a quantity of brazing composition on the bottom of a recess formed in an electrode, superimposing a carbon button having a shank portion and a flange portion over the brazing composition, interposing a ring surrounding said shank portion of said carbon button at least partially within said electrode recess, melting said brazing composition, urging said flanged portion of said carbon button against said recess bottom to cause said melted bonding composition to flow between said ring and at least one side of said electrode recess, and thereafter solidifying said brazing composition whereby said carbon button will be maintained at least partially within said recess.

4. The method of claim 3 wherein said brazing composition is a copper-silver eutectic brazing compound to provide good thermal and electrical contact between said carbon button and said electrode.

5. A method of assembling a target for a neutron generator comprising placing a quantity of a bonding composition into a recess formed in an electrode, placing a carbon type target material in said recess for contact with said bonding composition in said recess, placing a metallic retaining element, having an opening therein, on the side of said carbon type target material which faces an opening of said recess, said opening in said retaining element also facing the same direction as said recess opening, urging said carbon type target material against said bonding composition to cause said bonding composition to flow between said retaining element and at least one side of said electrode recess, whereby at least part of said carbon type target material will be maintained in said electrode recess by said retaining element.

* * * * *